Sept. 5, 1939.  C. K. ELLIOTT  2,171,827
DIRECT-ACTING HYDRAULIC SHOCK ABSORBER FOR MOTOR VEHICLES
Filed March 19, 1938  2 Sheets-Sheet 2
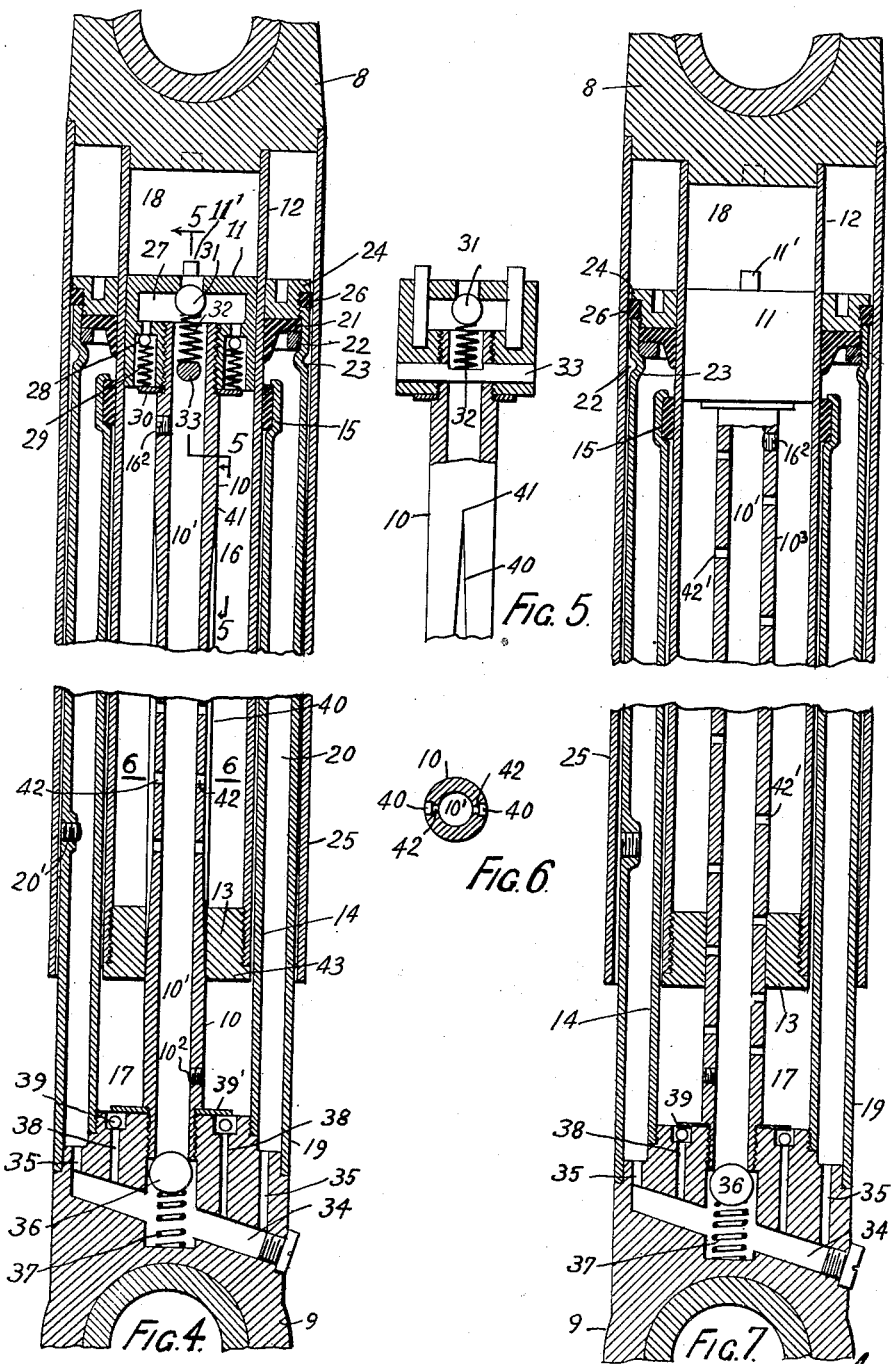

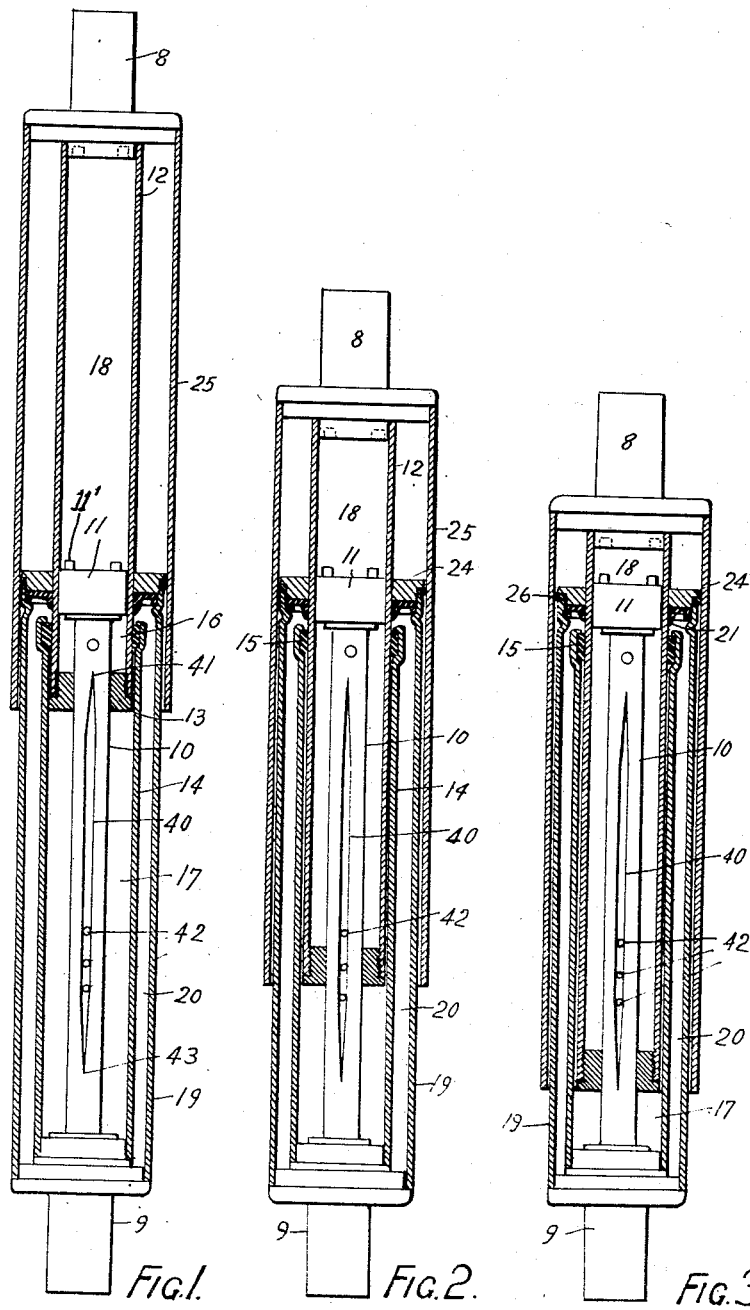

Patented Sept. 5, 1939

2,171,827

UNITED STATES PATENT OFFICE 2,171,827

DIRECT-ACTING HYDRAULIC SHOCK ABSORBER FOR MOTOR VEHICLES

Clifton Keith Elliott, Bellevue Hill, New South Wales, Australia

Application March 19, 1938, Serial No. 197,011
In Australia March 23, 1937

7 Claims. (Cl. 188—88)

This invention relates to hydraulic shock-absorbers of the direct-acting telescopic tube type for use on motor vehicles to control the compression and rebound flexure of the suspension springs of the vehicle. Shock-absorbers of this general type are described in United States Patent No. 2,004,380 and in such shock-absorbers the control on the springs is obtained by the control of the flow of oil from one chamber to another of the shock-absorber during flexure of the springs.

In known shock-absorbers of this type the flow of oil between the two chambers, to control the spring movement, is regulated by a relief valve and by the capacity of a relief passage, but as the capacity of this passage is constant, the resistance to the oil flowing through the passage is constant in any displaced position of the shock-absorber, and consequently the desired control or damping of the springs is not obtained.

The principal object of this invention is to provide a double acting shock-absorber of the stated type, in which a progressively increasing resistance is applied to displacement of the shock-absorber as the limit of its displacement in either direction is approached. In this manner but little resistance is offered to the initial flexure of the vehicle spring at the commencement of such flexure, but the resistance increases progressively with the amplitude of the flexure, at least after a certain displacement has occurred. By this means, considerably more effective damping of the spring flexure in either direction is obtained.

A further novel object of the invention is to provide a definite limit, by hydraulic locking, to displacement of the shock-absorber, and consequently to flexure of the springs. As a consequence, a metal-to-metal stop, with its attendant risk of fracture of the units, is avoided. This hydraulic limit is reached through gradually increasing pressure until further transference of the oil is cut off, and no further displacement of the shock-absorber can occur. The limiting position may be readily adjusted to retain spring flexure within any desired limits.

Other advantages over known shock-absorbers of this type are the low temperature of the oil which is obtained by extensive circulation, simplicity and accessibility of the valves, and an improved column support for the two telescoping units of the shock-absorber which results from the fact that the units are telescoped to a high degree before considerable pressure is applied.

In order to fully describe the invention reference is made to the accompanying drawings which depict a preferred embodiment of the invention, and a modified form thereof, and in which:

Fig. 1 is a longitudinal elevation in part cross-section, through the shock-absorber in the normal position, Fig. 2 is a similar view in a semi-compressed position.

Fig. 3 is a similar view in the fully compressed position.

Fig. 4 is a broken detailed cross-sectional elevation of the shock-absorber, in the fully compressed position, and at right angles to the views of Figs. 1, 2 and 3, Fig. 5 is a cross-sectional elevation on the line 5—5 of Fig. 4, Fig. 6 is a cross-sectional plan view on line 6—6 of Fig. 4, and Fig. 7 is a longitudinal cross-sectional elevation of a modified form of the shock-absorber.

As shown more particularly in Fig. 4, the shock-absorber comprises an upper head 8 and a lower head 9, which are fitted for attachment respectively to the chassis and sprung undercarriage of the motor vehicle, in known manner.

Into lower head 9 is threaded the lower end of a hollow oil tube 10, over the upper end of which is screwed a piston 11, which slides in a tube 12 welded on to upper head 8. Piston 11 is fitted with projecting pins 11', 11' for disassembly purposes. Tube 12 is closed at its lower end by piston head 13 which is a neat sliding fit about oil tube 10 and slides with clearance in tube 14, which is threaded on to lower head 9 and telescopes (with clearance) over tube 12 on which it is sealed by washer 15.

Piston 11 and piston-head 13 form between them a secondary compression chamber 16 between tubes 10 and 12; piston-head 13 and lower head 9 form between them a primary compression chamber 17 within tube 14; and piston 11 and upper head 8 form between them a vacuum chamber 18 within tube 12.

A tube 19, welded on to lower head 9, forms about tube 14, and an upper part of tube 12, an oil reservoir 20 which is fitted with a filling plug 20¹. Tube 19 is slidably sealed on to tube 12 by means of an annular L leather 21 which is clamped between a retaining ring 22, seating on an annular rib 23 on the inner surface of tube 19, and a retaining ring 24 threaded into the upper end of tube 19.

A dust-cover tube 25, welded on to upper head 8, telescopes over reservoir tube 19 with a clearance, and the ingress of dust is prevented by a felt washer 26 clamped between the upper end of reservoir tube 19 and the retaining ring 24.

A chamber 27 within piston 11 is in open communication with the bore 10¹ of tube 10, and this chamber 27 communicates with compression chamber 16 through one-way ball valves 28, 28 retained on their seats by springs 29, 29 which are maintained in position by a washer 30 about tube 10. A one-way ball valve 31 permits a return flow of leakage oil from vacuum-chamber 18 to piston chamber 27, and this valve is retained on its seat by spring 32 mounted on a pin 33 disposed across piston 11.

Reservoir 20 communicates with a cross-bore 34 in lower head 9 by means of a plurality of ducts 35, 35. The bore 10¹ of oil-tube 10 communicates with cross-bore 34 past a one-way ball valve 36 maintained on its seat by a spring 37. Cross-bore 34 communicates with compression chamber 17 by ducts 38, 38 past one-way ball valves 39, 39 maintained on their seats by gravity, and retained in place by washer 39¹ about tube 10.

Oil tube 10 has formed on its outer surface, at diametrically opposite positions, two longitudinal oil grooves 40, 40. These grooves are shown in side elevation in Fig. 4, in front elevation in Figs. 1 to 3 inclusive, and in cross-section in Fig. 6. The grooves 40, 40 are tapered from a starting point 41 adacent the upper end of the tube, to the deepest point, at which three spaced leakage apertures 42, 42 are formed in the wall of tube 10 connecting the grooves 40 with the bore 10¹ of the tube 10. From the deepest point the grooves 40, 40 gradually run out to a vanishing point 43 adjacent the lower end of the tube 10, but spaced from such lower end. The distance from the starting point 41 to the deepest point 42 is greater than the distance from the vanishing point 43 to the deepest point 42. Tube 10 is fitted with two soft metal blow-out safety plugs 10², 16².

The illustrative Figures 1 to 3, showing the shock-absorber in various stages of compression, should be read in conjunction with Fig. 4 which illustrates in more detail the transfer of oil which controls the function of the shock-absorber. The operation of the shock-absorber is as follows:

Presume that the shock-absorber is charged with oil, that is compression chambers 16 and 17, oil tube 10, piston chamber 27, and the ducts in the lower head 9 are fully charged, and that some excess oil remains in reservoir 20.

Fig. 1 shows the shock-absorber in the normal uncompressed condition. When the vehicle wheel rises upon impact with a road irregularity, the heads 8 and 9 are forced towards each other, and the tubes mutually telescope. Lower head 9 and piston 11 commence to move upwardly in relation to the upper head 8 and piston-head 13, which results in the oil in primary compression chamber 17 being placed under compression, and a negative pressure being established in secondary chamber 16.

Oil is therefore forced to flow from chamber 17 through leakage apertures 42 into the bore 10¹ of oil tube 10, whence it passes into chamber 27 in piston 11 and thence past ball valves 28, 28 (which are forced off their seats) into chamber 16, to charge the increasing volume of that chamber with the oil displaced from chamber 17, which is decreasing in volume. As oil tube 10 rises through piston head 13, the upper end of oil grooves 40 enter chamber 16 and present bypasses, so that oil is also transferred through the grooves 40 directly from chamber 17 to chamber 16. As oil tube 10 continues to rise, the cross-sectional area of grooves 40, 40 progressively increases, so that a progressively reducing resistance is offered, during this extensive initial movement, to the compression of the shock-absorber.

When, however, the compression has proceeded to the point (Fig. 2) where the leakage apertures 42, 42 pass under piston head 13, the escape of oil into the bore 10¹ of tube 10 is progressively cut off, so that the resistance to the escape of oil is progressively increased. It will be evident that when the compression has proceeded to a point where all the leakage apertures 42, 42 have passed under piston head 13, the only escape for the oil from chamber 17 into chamber 16 is by grooves 40, 40. But as the end of the compression displacement is approached, grooves 40, 40 progressively diminish in area, and the resistance to compression progressively increases correspondingly.

When the position shown in Fig. 3 is attained, piston head 13 has reached the end of grooves 40, and consequently no further oil can escape from chamber 17. This position is the end of the compression displacement, and the compressed oil remaining in chamber 17 constitutes a hydraulic lock which limits the compression without metal-to-metal contact. The position of the ends 41 and 43 of grooves 40 determines the maximum displacement of the shock-absorber.

The volume of chamber 16 is slightly less than that of chamber 17, owing to the difference in diameters of tubes 12 and 14, and any oil which is displaced from chamber 17 and which cannot be accommodated in chamber 16, is passed from bore 10¹ of oil tube 10 past ball valve 36 into cross-bore 34 and thence by ducts 35 into reservoir 20.

Also, during ascending movement of piston 11, leakage-oil which may have found its way into vacuum chamber 18 is forced, by compression in that chamber, past ball valve 31 into piston chamber 27, so that chamber 18 is constantly evacuated of oil and air.

When the vehicle spring commences its rebound movement (from the position of Fig. 3) which it is essential to damp, upper head 8, tubes 12 and 25, and piston head 13 commence to move upwardly in relation to the other parts, necessitating a re-transfer of oil from chamber 16 to chamber 17. As piston head 13 slides upwardly over oil tube 10 (from the position of Fig. 3), grooves 40, 40 are progressively uncovered and a reducing resistance is applied to the initial return flow of the oil from chamber 16 through the grooves and into chamber 17, whilst simultaneously oil is forced from chamber 16, via apertures 42 to the bore of tube 10, whence it flows past valve 36 to the reservoir 20.

The point of lowest resistance is reached as piston head 13 commences to slide upwardly over apertures 42, as thereafter the only escape of oil from chamber 16 to chamber 17 is by the grooves 40, 40 which are gradually and progressively reduced in cross-sectional area, thereby imposing a progressively increasing resistance against the spring rebound as the normal position is approached. When the piston head 13 runs to the upper ends 41 of grooves 40, no further flow of oil from chamber 16 can take place, and the movement ceases under a hydraulic lock in chamber 16, as shown in Fig. 1.

It will also be observed that as the zone of minimum resistance (the apertures 42, 42) is further from the upper end 41 of grooves 40 than from the lower end 43 thereof, a longer period of increasing resistance is offered to the rebound of the springs than is offered the initial compression thereof, which fulfills the condition for most effective spring control.

Throughout the rebound movement additional oil, to keep chamber 17 fully charged, is drawn from reservoir 20 through cross-bore 34, ducts 35 and ball valves 39.

The modified construction illustrated in Fig. 7 differs from that above described only in the construction of the oil tube 10³. In this construction the oil tube is formed along its length with a series of spaced leakage apertures 42¹, 42¹, which series of apertures terminates short of the piston 11 and lower head 9 in order to provide the hydraulic lock (above described) at either end of the displacement of the shock-absorber.

The operation of this modified form is identical with that previously described, except that all the oil transferred between chambers 16 and 17 passes through the bore 10¹ of oil tube 10³, and that the resistance against displacement of the shock-absorber is progressively increased in steps in place of a continuous increase.

It will be appreciated that as the shock-absorber is displaced from the normal expanded position oil is forced to flow from chamber 17 into the bore 10¹ of oil tube 10³, through the large number of apertures 42¹ at that time in register with that chamber, and thence into chamber 16 through piston chamber 17, and through any apertures 42¹ at that time in register with chamber 16. It will therefore be evident that but little resistance is presented to the transference of oil at this time, but as oil tube 10³ ascends through piston head 13, the number of leakage apertures 42¹ in communication with chamber 17 is reduced, and consequently the resistance against the flow of oil from chamber 17 is increased in steps. The maximum displacement is reached when oil tube 10³ ascends through piston head 13 to a point where the lowest aperture 42¹ passes thereunder, at which point the hydraulic lock in chamber 17 is established.

On the rebound movement of the shock-absorber the oil is re-transferred from chamber 16 to chamber 17 in exactly the converse manner. Thus the resistance to displacement of the shock-absorber in either direction increases progressively in steps from the beginning to the end of each displacement.

It will be appreciated from the foregoing description that the invention provides a shock-absorber of the stated type in which a progressively increasing resistance is offered to displacement of the shock-absorber as the end of the displacement in either direction is approached. This increasing resistance is caused by the progressive diminution of the cross-sectional area of oil grooves 40, and in the modified form, by the diminution of the number of escape apertures, in communication with the compression chamber from which the oil is flowing. In the construction of Fig. 3, which has oil grooves 40, the resistance does not commence to increase until after a certain displacement of the shock-absorber has taken place. In the construction of Fig. 7, however, the resistance increases throughout the displacement. This feature of increasing resistance results in very effective damping of the vehicle springs, which cannot be obtained with constant-resistance constructions.

Furthermore, a hydraulic lock in chambers 16 and 17 is obtained at the ends of the displacement in either direction respectively, so that no metal-to-metal stop is necessary. Moreover, variation of the position of the ends 41 and 43 of grooves 40 permits a simple means of controlling the extent of spring flexure.

The tubes are well telescoped before the resistance increases to a high degree, and consequently the units constitute a strong column which is not likely to collapse under severe stress. Further, the oil is circulated into and from the reservoir 20 during operation, as a result of which much of the oil heat is dissipated, and the oil temperature remains within safe limits.

I claim:

1. A shock-absorber of direct-acting telescopic-tube type, including an upper head and a lower head, an oil tube secured at one end centrally in the lower head and having a piston on its upper end slidably fitting in a concentric pendant tube attached at one end to the upper head, said pendant tube having on its lower end an annular piston slidably fitting about said oil tube, a third concentric tube located about the pendant tube, attached at one end to the lower head and at its upper end making sliding contact with the pendant tube, the space between said annular piston and the lower head constituting a lower compression chamber, and the space between the two pistons constituting a second or upper compression chamber, said oil tube having on its outer surface a groove constituting an oil transfer passage and so disposed that in any relative disposition of the pistons, except either extreme position, it establishes communication between both chambers, and in either extreme position is in communication with one chamber only, thus establishing an oil lock limiting the relative displacement of the pistons in either direction.

2. A shock-absorber as claimed in claim 1, in which the groove on the outer surface of the central oil tube is gradually diminished in cross sectional area at each end and ultimately vanishes, for the purposes of imposing a gradually increasing resistance to the flow of oil from one chamber to the other as the limit of relative displacement of the pistons in either direction is approached.

3. A shock-absorber as claimed in claim 1, in which the upper piston on the end of the central oil tube is chambered, the chamber being in open communication with the upper end of the central oil tube, and with the upper compression chamber through non-return valves, and in which the central oil tube is formed with relief holes to permit some of the oil displaced from one compression chamber and not accommodated in the other to pass into the bore of the central tube, said central tube at its lower end communicating through a non-return valve with a passage in the lower head which is itself in communication with an oil reservoir.

4. A shock-absorber as claimed in claim 1, in which the upper piston on the end of the central oil tube is chambered, the chamber being in open communication with the upper end of the central oil tube, and with the upper compression chamber through non-return valves, and in which the lower portion of the groove on the central tube is in communication with the bore of said tube to permit some of the oil expelled from the lower compression chamber to pass into the central tube, said central tube at its lower end being in communication through a non-return valve with an oil reservoir constituted by a fourth tube concentric with and spaced from the third tube and secured at its lower end to the lower head.

5. A shock-absorber of direct-acting telescopic-tube type, including an upper head and a lower head, an oil tube secured at one end centrally in the lower head and having a piston on its upper end slidably fitting in a concentric pendant tube attached at one end to the upper head, said pendant tube having on its lower end an annular piston slidably fitting about said oil tube, a third concentric tube located about the pendant tube, attached at one end to the lower head and at its upper end making sliding contact with the pendant tube, the space between said annular piston and the lower head constituting a lower compression chamber, and the space between the two pistons constituting a second or upper compression chamber, said central oil tube having in its wall a plurality of holes arranged in spaced relation along the length of the tube, said holes and the tube constituting oil transfer passages between the compression chambers, and said holes being so arranged that the number of holes in communication with one chamber is reduced and the number in communication with the other chamber is increased by and during relative displacement of the pistons so that the joint capacity of the holes in communication with one of the chambers is gradually diminished and an increasing resistance thus offered to the flow of oil during such displacement.

6. A shock absorber as claimed in claim 1 in which the groove on the central oil pipe has a zone of maximum cross sectional area intermediate its ends and is progressively reduced in cross sectional area towards its ends where it vanishes.

7. A shock-absorber of direct-acting telescopic-tube type, comprising, in combination, an upper head and a lower head, a central tube attached at its lower end to the lower head and carrying on its upper end a piston formed with a chamber in communication with the tube, a second or pendant tube attached at its upper end to the upper head and carrying on its lower end an annular piston the bore of which makes sliding contact with the central tube, a third tube attached at its lower end to the lower head, disposed about the pendant tube and at its upper end making sliding contact therewith, a fourth or oil reservoir tube attached to the lower head, surrounding the pendant tube and spaced therefrom, an annular head on the upper end of the reservoir tube, the bore of said head making a sliding fit with the pendant tube, said annular head constituting a top closure for the reservoir tube, in the lower head a cross passage in communication with the reservoir tube, and in communication through a non-return valve with the lower compression chamber below the annular head on the pendant tube, the central tube being also in communication with the passage in the lower head through a non-return valve, in the upper piston on the upper end of the central tube passages establishing communication through non-return valves between the chamber in said piston and the space or upper compression chamber between the two pistons, and a passage or passages whereby oil is transferred from one compression chamber to the other on relative telescopic movement of the elements of the device, the capacity of said oil transfer passage or passages being progressively reduced as the pistons approach either extreme position with consequent increase of resistance to the flow of oil.

CLIFTON KEITH ELLIOTT.